Patented Jan. 26, 1926.

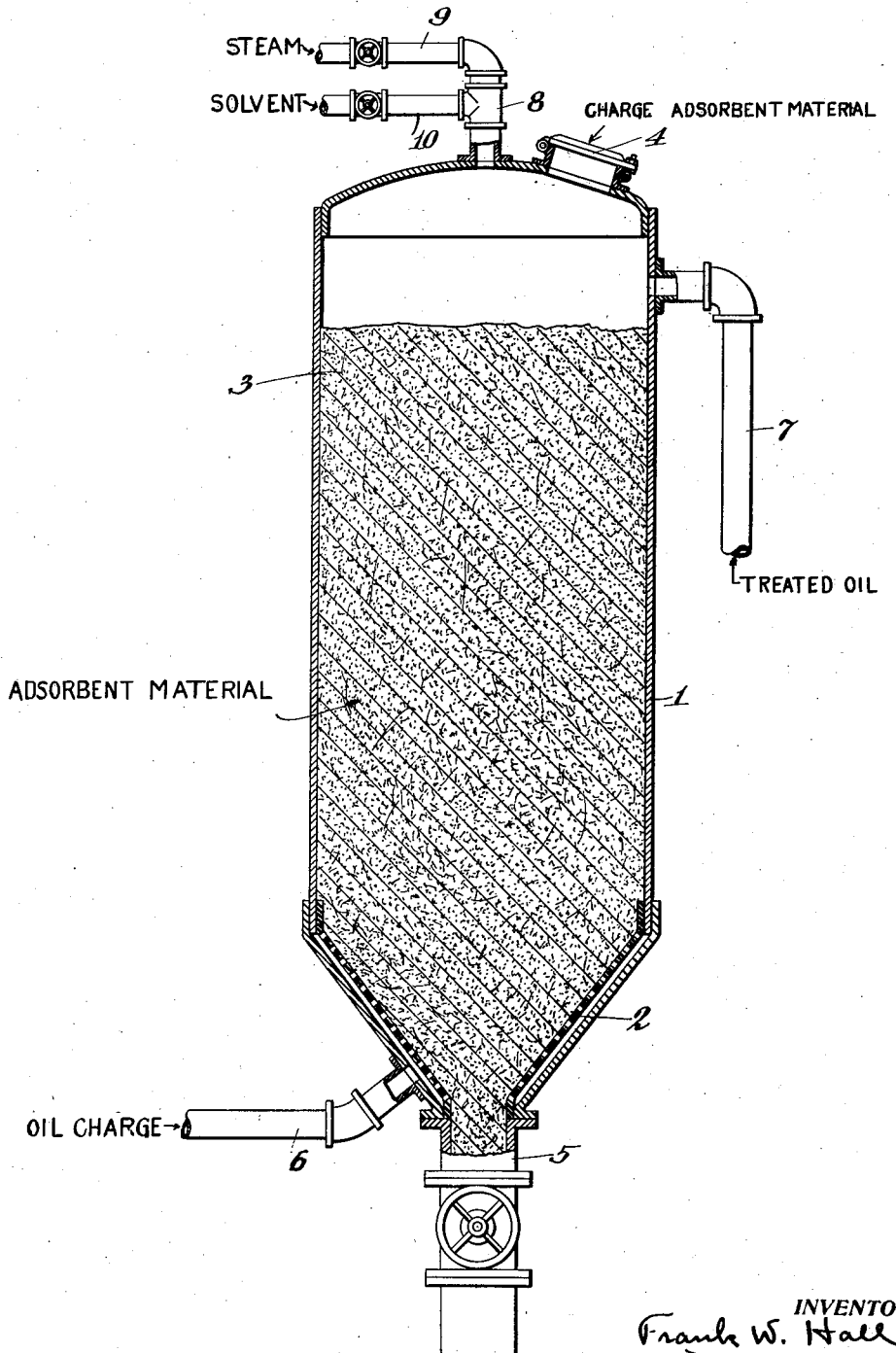

1,570,890

UNITED STATES PATENT OFFICE.

FRANK W. HALL, OF PORT ARTHUR, TEXAS, ASSIGNOR TO THE TEXAS COMPANY, OF NEW YORK, N. Y., A CORPORATION OF TEXAS.

TREATING HYDROCARBON OILS.

Application filed September 20, 1921. Serial No. 501,986.

*To all whom it may concern:*

Be it known that I, FRANK W. HALL, a citizen of the United States, residing in Port Arthur, county of Jefferson, and State of Texas, have invented certain new and useful Improvements in Treating Hydrocarbon Oils, of which the following is a specification.

This invention relates to the treatment of hydrocarbon oils for the purpose of reducing the content of unsaturated compounds and for improving the color of the oil, and has special reference to the preparation of water white oils suitable for medicinal purposes.

I have discovered that if oils be passed upwardly through a column of fuller's earth, or clay, or other suitable material having adsorptive qualities, that the porous particles apparently exercise catalytic properties causing the oil coming in contact with the air in the pores of the material to be oxidized. The oxidizing action continues while the oils being passed upwardly through the clay until the air has been wholly expelled from the porous material.

The oxidizing action cannot be produced, at least in any effective manner, by allowing the oil to gravitate through contact material since when oil is allowed to pass downwardly through the mass it tends to channel and pass through in irregular streams so that any oxidizing effect is dissipated.

My invention contemplates, therefore, a method of operation in which the oil is caused to percolate upwardly through porous catalytic material while in contact with oxygen in the pores of the material and in the interstitial spaces between the particles whereby an oxidation of certain of the hydrocarbon compounds occurs.

In the accompanying drawing, I have shown in vertical section a preferred form of apparatus adapted for carrying out the invention.

In the apparatus thus illustrated a vessel 1, preferably of substantially cylindrical form, is provided. The bottom of the vessel is preferably conical in shape and is equipped with a false bottom or perforated plate 2 which is adapted to support contact material 3, such as fuller's earth, or other suitable clay or material having adsorptive and catalytic properties. The contact material may be charged into the vessel 1 thru a manhead 4. At the bottom of the vessel is an outlet 5 for removing the spent contact material and a charging pipe 6 thru which the oil to be treated is introduced into the reaction vessel. At the top of the vessel is an overflow pipe 7. A line 8 may also be provided having branch lines 9 and 10 for steam and naphtha, respectively, the steam and the solvent oil being employed for removing the oil remaining in the contact material at the conclusion of a run.

In carrying on the process the contact material is placed in the reaction vessel 1 and the oil to be treated is then forced thru the pipe 6 into the bottom of the vessel. The oil percolates up thru the contact material; it does not channel as is the case when oil is allowed to gravitate thru porous material but passes up thru the entire mass, the level of the oil rising evenly thru the contact material.

While the oil is thus in contact with the air in the pores of the contact material and in the interstitial spaces between the particles, a reaction occurs which I believe is an oxidizing action. It is not ordinarily necessary to heat the materials entering into the reaction since the action takes place at normal atmospheric temperature. During the period of contact of the air with the oil the temperature of the oil is raised approximately 40° to 70° Fahrenheit. The oil discharged thru the outlet 7 is colorless and odorless and its iodin value is greatly reduced, indicating that the color element in the oil has been adsorbed by the contact material and that oxidation of unsaturated hydrocarbon compounds has taken place. After the air has been wholly expelled from the contact material the oxidation action apparently ceases but the adsorptive action of the porous material for the color element generally continues for some time.

The product derived from the oxidation action may be used for medicinal oils or for other high grade oils demanding low color and low iodin value. The passage of oil thru the contact material may be continued after the oxidation has terminated and the contact material employed to improve the color of the oil. In fact, such a procedure is to be recommended since a far more efficient decolorizing is obtained by this method than in prior systems of filtering oils wherein the oils are caused to gravitate thru a filtering medium. If desired, the treated oil produced during the oxidation action, or while the oil is in contact with air in the adsorbent material, may be mixed with the oil treated after the air has been expelled to yield a product lower in color and iodin value than it has been possible to obtain in prior commercial processes.

Obviously, various modifications of the invention may be effected without departing from the spirit and scope of the invention. The true scope of the invention is defined in the appended claims.

What I claim is:—

1. The process of treating hydrocarbon lubricating oils that comprises passing the oil, substantially free from water, upwardly through a mass of adsorbent clay.

2. The process of treating hydrocarbon lubricating oils that comprises passing the oil, substantially free from water, upwardly through a mass of adsorbent clay exposed to the atmosphere whereby the oil in passage therethrough is raised in temperature and lowered in color and iodine value.

3. The process of treating hydrocarbon lubricating oils that comprises passing the oil, substantially free from water, upwardly through a mass of adsorbent clay exposed to the atmosphere whereby air is displaced from said clay and the oil in passage raised in temperature and lowered in color and iodine value, and continuing the passing of oil through said clay after the air has been thus displaced.

4. The process of treating hydrocarbon lubricating oils which comprises forcing the oil, substantially free from water, upwardly through a mass of fuller's earth.

5. The process of treating hydrocarbon lubricating oils which comprises passing the oil, substantially free from water, upwardly through a mass of adsorbent clay having the property of reducing the iodine value of an oil, until such property is substantially destroyed, separately collecting the oil thus effected and subsequently continuing the passing of additional oil through said clay.

In witness whereof, I have hereunto set my hand this 29th day of August 1921.

FRANK W. HALL